No. 787,742. PATENTED APR. 18, 1905.
O. EIGEN.
METHOD OF WELDING.
APPLICATION FILED MAY 12, 1902.

WITNESSES:
W. H. Avery
W. Harrison

INVENTOR
Otto Eigen
BY
ATTORNEYS

No. 787,742.

Patented April 18, 1905.

UNITED STATES PATENT OFFICE.

OTTO EIGEN, OF DUISBURG, GERMANY, ASSIGNOR TO DUISBURGER MASCHINENBAU-ACTIEN-GESELLSCHAFT, VORMALS BECHEM & KEETMAN, OF DUISBURG, GERMANY.

METHOD OF WELDING.

SPECIFICATION forming part of Letters Patent No. 787,742, dated April 18, 1905.

Application filed May 12, 1902. Serial No. 106,889.

*To all whom it may concern:*

Be it known that I, OTTO EIGEN, engineer, a subject of the Emperor of Germany, residing at 12 Brauerstrasse, Duisburg, in the Empire of Germany, have invented a certain new and useful Improved Method of Welding, of which the following is a specification.

This invention relates to an improved method of welding together the ends of bars, rails, rings, and the like.

The process is especially adapted for the manufacture of welded chains. Its novelty resides in the fact that the two extremities of a chain-link, of two bars, rails, or the like which are to be welded together and which have been heated to welding heat are submitted to the action of two pressure-rolls rotating in the same direction in such a manner that the said extremities which are to be united are pressed one against the other both in the longitudinal direction of the bar and also transversely of the same. These pressure-rolls may act upon the joint either with equal or unequal circumferential velocities. If the velocities of the two rolls are different, the parts to be welded together will not only be pressed together, but the work will at the same time be advanced between the rolls. If desired, this displacement of the work may be effected mechanically by any other suitable means.

The rolls, which with the arrangement described above simultaneously produce pressing and rolling, may, if desired, be so arranged that after the welding operation is finished they are caused to rotate in opposite directions, by which means the rolls effect the ordinary rolling of the weld and also of the rest of the work.

Figure 1:
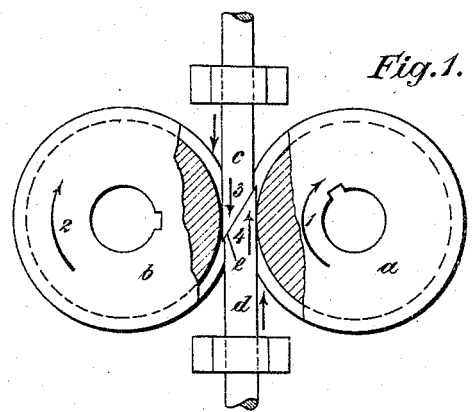
Figure 2:
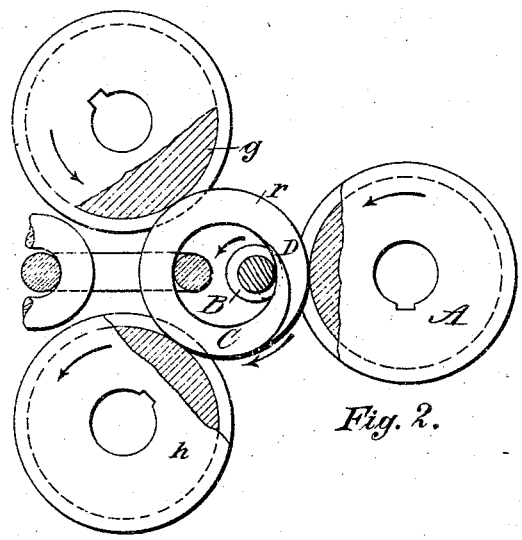

In the accompanying drawings, Figure 1 is a diagrammatic plan showing two bars being welded together by my method; and Fig. 2 is a diagrammatic elevation, partly in section, showing a link being welded by my method.

These extremities are preferably beveled or chamfered in the usual manner. The rolls *a* and *b* both run in the same direction, as indicated by the arrows 1 and 2. The tendency of the roll *b* is to displace the part *c* in the direction of the arrow 3, while the tendency of the roll *a* is to displace the part *d* in the direction of the arrow 4. By this means the two parts are firmly pressed one against the other, so that owing to the pressure exerted by the rolls the parts will be thoroughly welded together, it being of course understood that both ends have previously been raised to welding heat. The rolls also exert a pressure upon the work transversely to the longitudinal direction of the weld, thereby greatly improving the welding operation, and a thoroughly-reliable weld is always produced. The parts to be welded may be heated by means of a smith's fire or by any other suitable means in the known manner.

If shaped bars are being treated, the section of the rolls may advantageously correspond with that of the bars, as thereby the proper form is at once given to the welded portion. The rolls are also adapted for working the rest of the bar, thus improving the quality of the material and exactly calibrating the welded object throughout its entire length.

As is well known, welding heat causes the material to lose its fibrous quality. This quality may, however, be restored to it by the rolling which follows the welding operation. If the two rolls *a* and *b* are caused to rotate with different circumferential velocities, but in the same direction, the welding and pressing operations take place exactly in the manner described above, except that owing to the difference of velocity displacement of the work takes place, so that the weld passes between the rolls. The arrangement may also be such that upon the termination of the welding and pressing operations one of the two rolls is either released or caused to rotate in the reverse direction, thus effecting the ordinary rolling operation. This is advantageous in the manufacture of chain-links, for example, which process is illustrated in Fig. 2 of the drawings.

In effecting the welding of chain-links in accordance with this invention, as illustrated in Fig. 2, the link $r$, the two extremities C and D of which are to be united, is acted upon by a small roll B, which is passed through the link. For this roll B may be substituted a mandrel-roller journaled at one extremity only. During the operation the link $r$ may be guided by suitable guide-rolls $g$ and $h$. The continuous pressure between the rolls A and B in the directions indicated forces the ends C and D integrally together, thus forming a neat and strong weld. In this case also the pressing and welding of the two ends C and D takes place owing to the fact that the two rolls A and B rotate in the same direction. After some time the aforesaid small roll B is either released or caused to rotate in the reverse direction, whereupon the whole link is rolled, thus improving the quality of the material by giving it a constant uninterrupted fibrous formation throughout its whole circumference, while at the same time calibration is effected and the surface of the ring is rendered compact, hard, and smooth, thus greatly increasing its strength. The treatment of the link after welding may be continued until the lowest limit of temperature is reached at which said link can be given its oval form. During this operation of pressing the link oval a transverse stay or member may be inserted, if desired. In this manner chains with oval links or with transverse stays may be manufactured with only one heating of each link. The welding operation and the whole of the subsequent treatment of the link may be carried out with one heating.

It will be observed that with the rolls $a\,b$ (shown in Figs. 1 and 2) rotating in the direction indicated the beveled surfaces to be welded are forced together by rolling pressures of contrary direction. The result is that the welded surfaces are squeezed together in one direction by the direct pressure of the rolls and are also forced together in a direction at right angles to the direction just mentioned by the rotative effect of the roll. If, however, the direction of one of the rolls is changed, the beveled surfaces will still be squeezed together by the direct pressure of the rolls, but will not be forced in opposite directions along the path of travel of the body to be welded.

What I claim, and desire to secure by Letters Patent of the United States, is—

1. The method herein described of welding by means of rolling pressures, which consists in providing the members to be welded with bevels, heating said members, placing said bevels together face to face, and subjecting said members to rolling pressures which force said members directly toward each other in two independent directions crossing the general direction of the bevels.

2. The method herein described of welding by means of rolling pressures, which consists in providing the articles with oppositely-disposed members having bevels, placing said bevels in contact face to face, and forcing said members toward each other in two independent directions crossing the general planes of said bevels.

In testimony whereof I have hereunto set my hand, in presence of two subscribing witnesses, this 23d day of April, 1902.

OTTO EIGEN.

Witnesses:
 WILLIAM ESSENWEIN,
 PETER LIEBER.